(12) United States Patent
Mital et al.

(10) Patent No.: US 8,043,394 B2
(45) Date of Patent: Oct. 25, 2011

(54) PARTICULATE MATTER FILTER ASSEMBLY WITH A FLOW DEVICE

(75) Inventors: Rahul Mital, Rochester Hills, MI (US); David B. Brown, Brighton, MI (US); Jianwen Li, Canton, MI (US); Michael Christopher Luckham, Highland, MI (US); Kevin B. Fuqua, Clarkston, MI (US); Kasser A. Jaffri, Rochester, MI (US); Linda Garcia, Royal Oak, MI (US)

(73) Assignee: GM Global Technology Operations LLC

( * ) Notice: Subject to any disclaimer, the term of this patent is extended or adjusted under 35 U.S.C. 154(b) by 332 days.

(21) Appl. No.: 12/251,734

(22) Filed: Oct. 15, 2008

(65) Prior Publication Data
US 2009/0235653 A1    Sep. 24, 2009

Related U.S. Application Data

(60) Provisional application No. 61/038,501, filed on Mar. 21, 2008.

(51) Int. Cl.
*B01D 50/00* (2006.01)
(52) U.S. Cl. ...... 55/337; 55/523; 55/385.3; 55/DIG. 30; 95/268; 60/311; 60/324; 60/274; 60/295; 422/177; 422/178; 422/179
(58) Field of Classification Search .................... 55/337, 55/DIG. 30, 385.3, 523; 60/311, 324, 274, 60/295; 422/177–180; 95/268
See application file for complete search history.

(56) References Cited

U.S. PATENT DOCUMENTS

| | | | |
|---|---|---|---|
| 3,448,563 A * | 6/1969 | Sobeck | 55/347 |
| 3,964,875 A | 6/1976 | Chang et al. | |
| 4,999,036 A * | 3/1991 | Hwang et al. | 55/317 |
| 5,083,435 A * | 1/1992 | Lin | 60/280 |
| 5,403,367 A * | 4/1995 | De Villiers et al. | 55/320 |
| 5,676,717 A * | 10/1997 | Cope et al. | 55/321 |
| 5,678,403 A * | 10/1997 | Kanehara et al. | 60/309 |
| 5,916,134 A | 6/1999 | Yang et al. | |
| 6,258,144 B1 * | 7/2001 | Huang | 55/385.3 |
| 6,331,195 B1 * | 12/2001 | Faust et al. | 55/396 |
| 6,540,917 B1 * | 4/2003 | Rachels et al. | 210/512.1 |
| 6,833,023 B1 * | 12/2004 | Vandenberghe et al. | 95/268 |
| 7,156,889 B1 * | 1/2007 | Swanson et al. | 55/337 |
| 7,179,315 B2 * | 2/2007 | Huang | 55/337 |
| 7,491,254 B2 * | 2/2009 | Krisko et al. | 55/337 |

(Continued)

FOREIGN PATENT DOCUMENTS

JP    06212943 A   *  8/1994

OTHER PUBLICATIONS

Translation of JP 06212943 A, Aug. 1994, 7 pages.*

*Primary Examiner* — Jason M Greene
*Assistant Examiner* — Dung H Bui

(57) ABSTRACT

A particulate matter (PM) filter assembly includes a PM filter that filters PM from an exhaust stream and that includes an entry face facing a first direction of flow of the exhaust stream, and a swirl element disposed in the exhaust stream and that includes a blade that directs a portion of the exhaust stream in a second direction of flow that is different than the first direction of flow. The blade directs the portion of the exhaust stream to distribute the exhaust stream over a frontal area of the entry face of the PM filter. A related method of filtering particulate matter from an exhaust stream is also provided.

19 Claims, 5 Drawing Sheets

U.S. PATENT DOCUMENTS

| | | | |
|---|---|---|---|
| 7,533,522 B2 * | 5/2009 | Klein | 60/286 |
| 7,682,413 B2 * | 3/2010 | Sheidler | 55/345 |
| 2005/0056008 A1 * | 3/2005 | Endo | 60/311 |
| 2007/0062181 A1 | 3/2007 | Williamson et al. | 60/297 |
| 2007/0125076 A1 * | 6/2007 | Nosaka et al. | 60/297 |
| 2007/0144158 A1 | 6/2007 | Girard et al. | |
| 2007/0227109 A1 * | 10/2007 | Hong et al. | 55/523 |
| 2008/0087013 A1 * | 4/2008 | Crawley et al. | 60/320 |
| 2008/0110140 A1 * | 5/2008 | Egger | 55/337 |
| 2008/0127641 A1 * | 6/2008 | Kellermann | 60/324 |

* cited by examiner

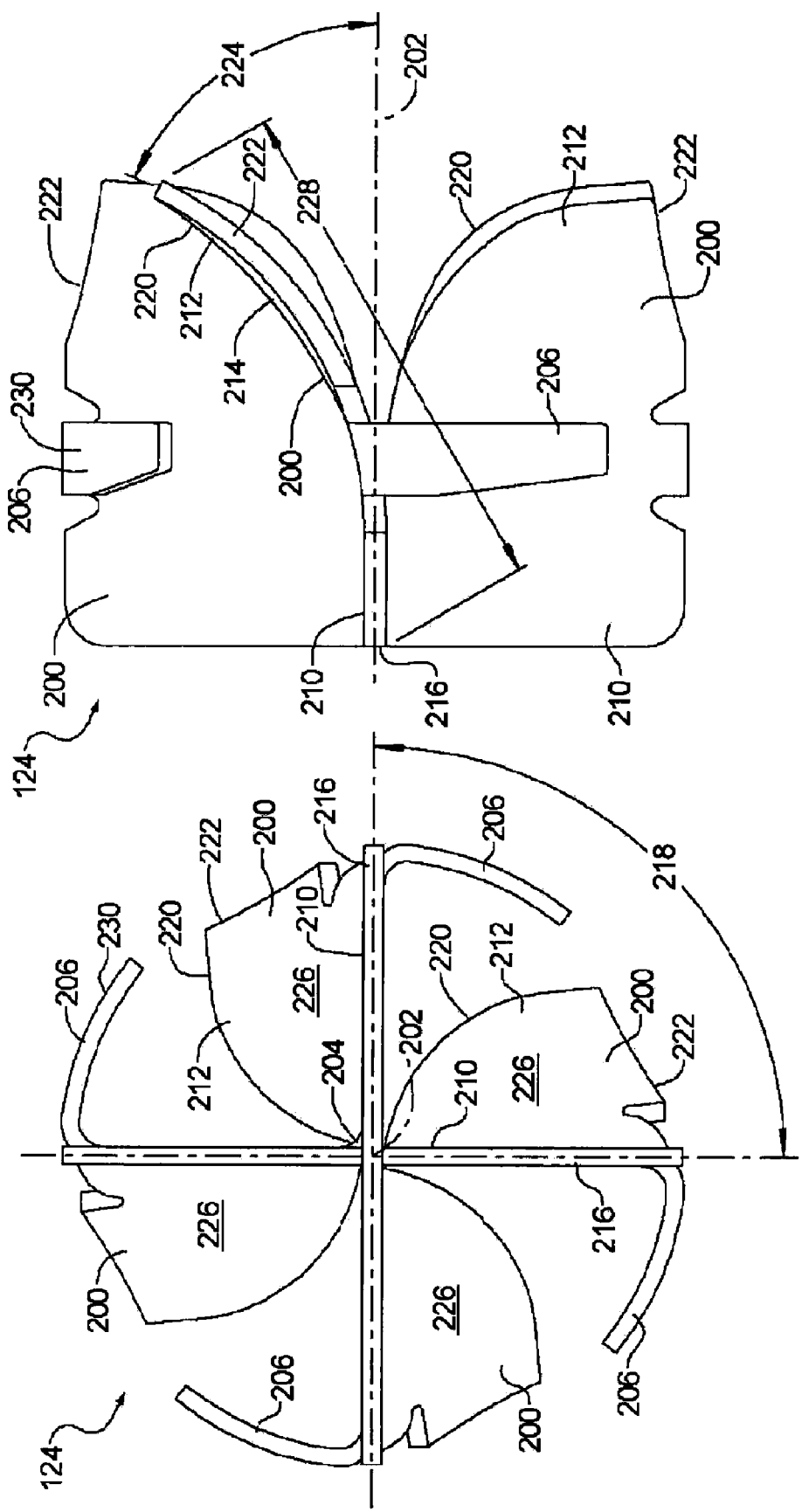

PARTICULATE MATTER FILTER ASSEMBLY WITH A FLOW DEVICE

CROSS-REFERENCE TO RELATED APPLICATIONS

This application claims the benefit of U.S. Provisional Application No. 61/038,501, filed on Mar. 21, 2008. The disclosure of the above application is incorporated herein by reference.

FIELD

The present disclosure relates to vehicle emissions and, more particularly, to particulate matter filter assemblies.

BACKGROUND

The background description provided herein is for the purpose of generally presenting the context of the disclosure.

Diesel engines combust diesel fuel in the presence of air to produce power. The combustion of diesel fuel produces exhaust gas that contains particulate matter. The particulate matter may be filtered from the exhaust gas using a diesel particulate filter (DPF). Over time, the particulate matter may accumulate within the DPF and may restrict the flow of exhaust gas through the DPF. Particulate matter that has collected within the DPF may be removed by a process referred to as regeneration. During regeneration, particulate matter within the DPF may be combusted.

Regeneration may be accomplished, for example, by injecting fuel into the flow of exhaust gas upstream of the DPF. One or more catalysts also may be disposed in the stream of exhaust gas and may combust the injected fuel. The combustion of the injected fuel by the catalysts generates heat, thereby increasing the temperature of the exhaust gas. The increased temperature of the exhaust gas may cause particulate matter accumulated within the DPF to combust.

The exhaust gas produced by diesel engines also contains gaseous compounds, such as nitrogen oxide ($NO_x$), and may be treated to reduce the emission of the gaseous compounds. For example, a selective catalytic reduction (SCR) system, which injects an ammonia compound into the exhaust gas, may be used to reduce the emission of $NO_x$ compounds.

SUMMARY

In one form, the present disclosure provides a particulate matter (PM) filter assembly that includes a PM filter that filters PM from an exhaust stream and that includes an entry face facing a first direction of flow of the exhaust stream, and a swirl element disposed in the exhaust stream and that includes a blade that directs a portion of the exhaust stream in a second direction of flow that is different than the first direction of flow.

In one example, the present disclosure provides a PM filter assembly that includes a PM filter that filters PM from an exhaust stream and that includes an entry face facing a first direction of flow of the exhaust stream, an inlet pipe that supplies the exhaust stream to the PM filter and that includes a first end and a second end downstream of the first end, wherein the second end defines a first flow area of the exhaust stream, an expansion pipe that is disposed between the inlet pipe and the PM filter and defines a cavity adjoining the entry face, and that includes a third end connected to the second end and a fourth end adjoining the entry face, wherein the cavity is larger at the fourth end than at the third end, and a swirl element that is disposed in the second end and extends into the cavity, and that includes a plurality of blades positioned at rotational angles about a first axis, wherein the first flow area is less than a frontal area of the entry face, and wherein each of the blades directs a portion of the exhaust stream in one of a plurality of second directions of flow different than the first direction of flow to distribute the exhaust stream over the frontal area.

In another form, the present disclosure provides a method of filtering particulate matter that includes providing an exhaust stream that has a first flow area in a first direction of flow, providing a PM filter that filters PM from the exhaust stream and that includes an entry face that faces the first direction of flow and has a frontal area greater than the first flow area, and distributing the exhaust stream over the frontal area of the entry face by directing a portion of the exhaust gas stream in a second direction of flow different than the first direction of flow, wherein the step of distributing the exhaust stream further includes disposing a blade in the exhaust stream that directs the portion of the exhaust stream in the second direction of flow.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 4 is a front view of the swirl element shown in FIG. 3;

FIG. 5 is a side view of the swirl element shown in FIG. 3; and

DETAILED DESCRIPTION

Figure 1:
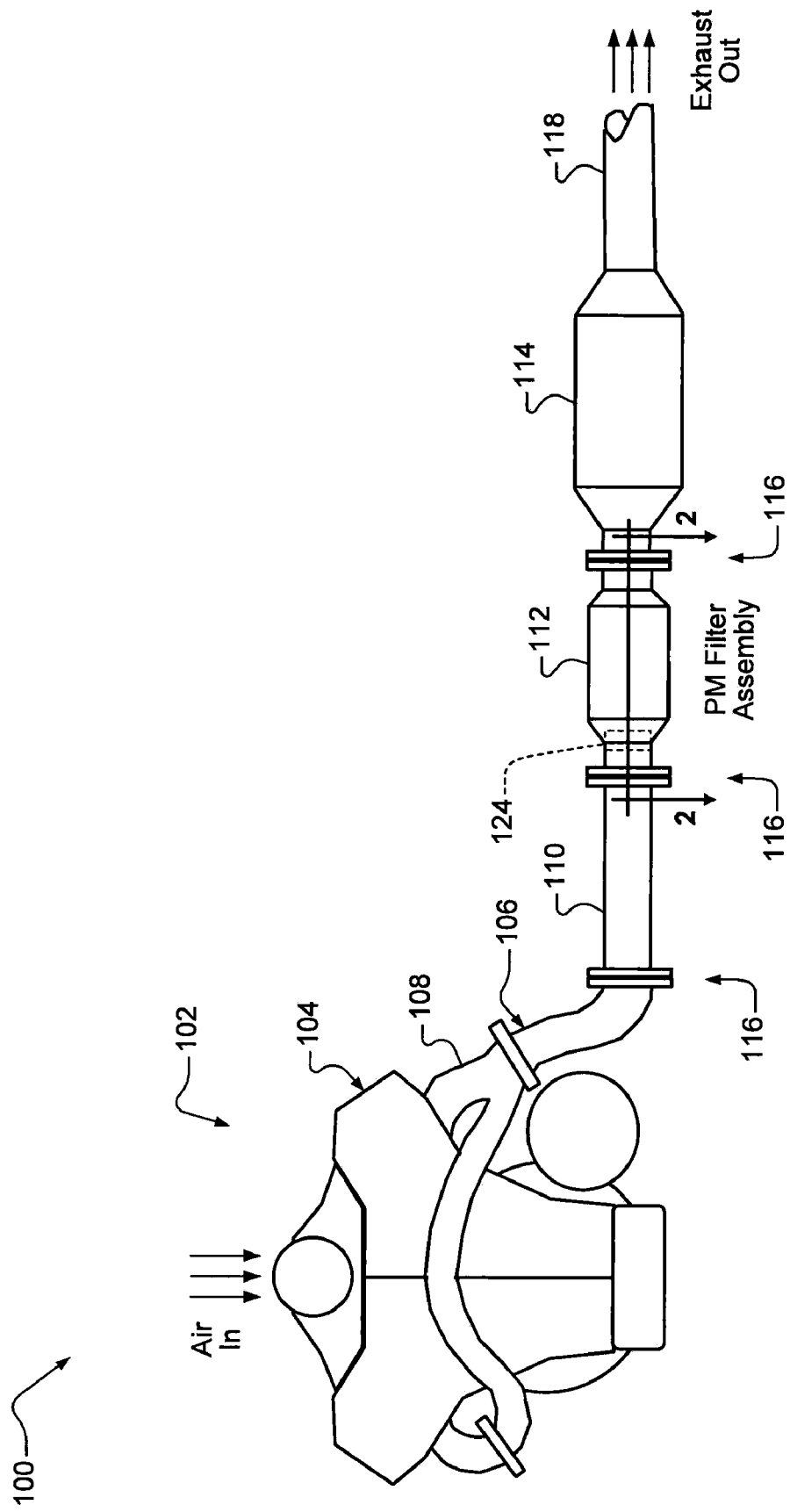
FIG. 1 is a functional block diagram of an exemplary engine and exhaust system according to the principles of the present disclosure.

The following description is merely exemplary in nature and is in no way intended to limit the disclosure, its application, or uses. For purposes of clarity, the same reference numbers will be used in the drawings to identify similar elements.

With reference to FIG. 1, a functional block diagram of an exemplary engine and exhaust system 100 for a motor vehicle is shown. The engine and exhaust system 100 may include a diesel engine system 102. While diesel engine system 102 is shown, the present disclosure is applicable to gasoline engine systems, homogeneous charge compression ignition engine systems, and/or other engine systems.

The diesel engine system 102 includes an engine 104 and an exhaust system 106. The engine 104 combusts a mixture of air and diesel fuel to produce power (e.g., torque). The combustion of the air and fuel mixture produces hot exhaust gas that may be expelled from the engine 104 into the exhaust system 106. The hot exhaust gas produced by the engine 104 may contain a mixture of gaseous compounds and particulate matter that enters the exhaust system and may be treated therein prior to exiting the exhaust system 106.

The exhaust system 106 may include an exhaust manifold assembly 108, an intermediate pipe assembly 110, a particulate matter (PM) filter assembly 112, and a muffler assembly 114. The exhaust system 106 may also include an exhaust gas recirculation (EGR) assembly (not shown) that recirculates a portion of the exhaust gas back to the engine 104. The exhaust manifold assembly 108, intermediate pipe assembly 110, PM filter assembly 112, and muffler assembly 114 may be coupled together by a series of flanged connections 116 or any other suitable method, such as by welding.

Exhaust gas produced by the engine 104 flows through the exhaust manifold assembly 108 to the PM filter assembly 112 via the intermediate pipe assembly 110. Exhaust gas exiting the PM filter assembly 112 flows through the muffler assembly 114 and is released to the atmosphere through a tailpipe 118. The intermediate pipe assembly 110 may include exhaust gas aftertreatment systems, such as but not limited to, a diesel oxidation catalyst (DOC) assembly and a selective catalytic reduction (SCR) assembly. A DOC assembly may be included to oxidize particulate matter such as hydrocarbons and/or carbon oxides in the exhaust gas. An SCR assembly may be included to inject ammonia or urea into the exhaust gas and thereby reduce the emission of NOx in the exhaust gas.

The PM filter assembly 112 filters particulate matter from the exhaust gas flowing through the PM filter assembly 112. Particulate matter may accumulate within the PM filter assembly 112 during a process referred to as loading and thereby restrict the flow of exhaust gas through the PM filter assembly 112. Particulate matter that has accumulated within the PM filter assembly 112 may be removed by a process referred to as regeneration. During regeneration, heat carried by the exhaust gas is used to combust the particulate matter present in the PM filter assembly 112. A discussion of a DPF assembly and the regeneration process can be found in commonly assigned U.S. patent application Ser. No. 11/233,450, filed Nov. 22, 2005, which is incorporated herein by reference.

Figure 2:
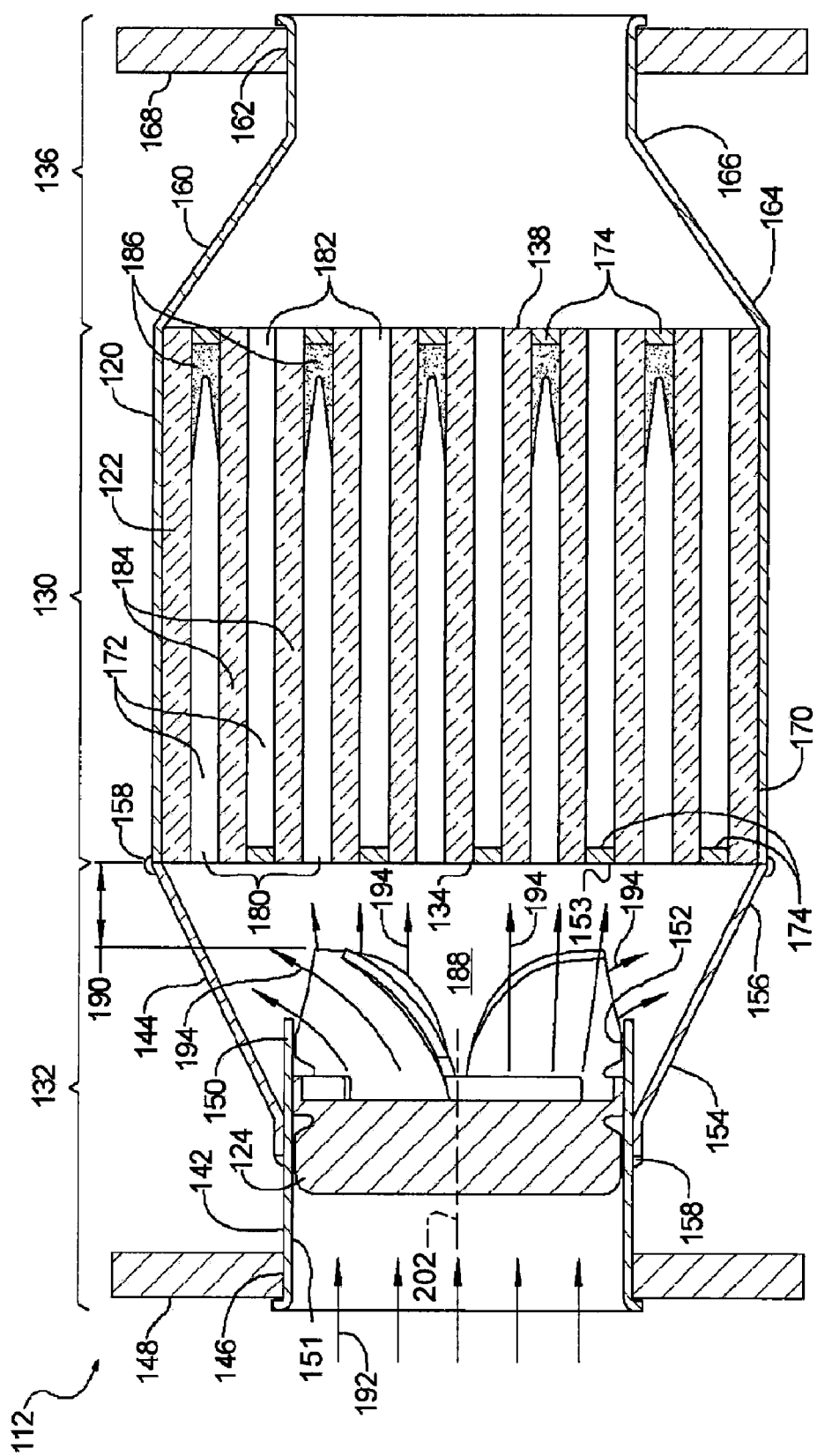
FIG. 2 is a cross-sectional view of an exemplary particulate filter assembly according to the principles of the present disclosure.

With reference to FIG. 2, a cross-sectional view of an exemplary implementation of the PM filter assembly 112 according to the principles of the present disclosure is shown. The PM filter assembly 112 includes a housing 120, a monolith filter assembly 122, and a swirl element 124. The housing 120 may include a center section 130 that contains the filter assembly 122. The housing 120 may further include an inlet section 132 located adjacent an entry face 134 of the filter assembly 122 and an outlet section 136 located adjacent an exit face 138 of the filter assembly 122.

The inlet section 132 may be located upstream of the filter assembly 122 to fluidly connect the filter assembly 122 to the intermediate pipe assembly 110. For example, the inlet section 132 may include an inlet pipe 142 and an expansion pipe 144. The inlet pipe 142 may deliver exhaust gas exiting the intermediate pipe assembly 110 to the expansion pipe 144. Accordingly, the inlet pipe 142 may include a first end 146 coupled to the intermediate pipe assembly 110 via a flange 148 and a second end 150 extending into the expansion pipe 144. The inlet pipe 142 may be generally straight as shown (FIG. 2). Thus, the inlet pipe 142 may include a cylindrical inner wall 151.

The expansion pipe 144 may deliver exhaust gas exiting the inlet pipe 142 to the filter assembly 122. More specifically, the expansion pipe 144 may deliver exhaust gas exiting the inlet pipe 142 to the entry face 134 of the filter assembly 122. In a typical arrangement, the second end 150 of the inlet pipe 142 may define an opening section 152 that has a cross-sectional area that is less than a frontal area 153 of the entry face 134 that confronts the exhaust gas. Accordingly, the expansion pipe 144 may include a narrow end 154 that receives the second end 150 of the inlet pipe 142 and a wide end 156 opposite the narrow end 154 that adjoins the entry face 134 of the filter assembly 122. The expansion pipe 144, inlet pipe 142, and flange 148 may be secured together by any suitable means, including one or more welds 158.

The outlet section 136 may be located downstream of the filter assembly 122 to fluidly connect the filter assembly 122 to the muffler assembly 114. For example, the outlet section 136 section may include a reducer pipe 160 and an outlet pipe 162. The reducer pipe 160 may deliver exhaust gas exiting the filter assembly 122 to the outlet pipe 162. The reducer pipe 160 may include a first end 164 that adjoins the exit face 138 of the filter assembly 122 and a second end 166 opposite the first end 164 that is connected to the outlet pipe 162. The first end 164 may be larger than the second end 166 as shown. The reducer pipe 160 and outlet pipe 162 may be integrally formed with the center section 130. The outlet section 136 may further include a flange 168 that works together with the outlet pipe 162 to couple the PM filter assembly 112 to the muffler assembly 114.

The filter assembly 122 may include a filter substrate 170 that may define a series of honeycomb channels 172 that may extend from the entry face 134 to the exit face 138. Each of the channels 172 may be sealed on one end by end plugs 174 such that a series of alternating inlets 180 and outlets 182 are formed thereby. The inlets 180 may be arranged in a generally uniform manner over the frontal area 153 of the entry face 134. Exhaust gas may enter the filter assembly 122 and be forced through porous walls 184 of the filter substrate 170 before exiting the filter assembly 122. Particulate matter in the exhaust gas may be trapped by the walls 184 and accumulate to form deposits 186 in the channels 172. The walls 184 of the filter substrate 170 may be made of any material suitable for filtering particulate matter in the exhaust gas. For example, the walls 184 may be made of a cordierite or silicon carbide material.

The swirl element 124 may be disposed in the inlet pipe 142 at the second end 150 and may protrude into a cavity 188 formed by the expansion pipe 144. The swirl element 124 may be positioned a distance 190 away from the entry face 134 of the filter assembly 122. The swirl element 124 may separate a stream 192 of exhaust gas entering the PM filter assembly 112 into flow fields 194. The swirl element 124 may lift and direct the flow fields 194 in a direction of flow that is different than the direction of flow of stream 192. The swirl element 124 may direct the flow fields 194 outward in a direction away from the direction of flow of stream 192 towards the wide end 156 of expansion pipe 144. The swirl element 124 also may direct the flow fields 194 in a manner that creates a spiral or rotational flow (i.e., vortex) of exhaust gas downstream of the swirl element 124.

By separating, directing, and imparting a rotational flow to the stream of exhaust gas entering the PM filter assembly 112, the swirl element 124 may be used to more uniformly distribute heat and particulate matter contained in stream 192 over the entry face 134 of the filter assembly 122. Thus, the swirl element 124 may be used to achieve a more even distribution of heat and soot (i.e., deposits 186) among the channels 172 during loading and regeneration. Similarly, the swirl element 124 may be used to achieve improved distribution and mixing of other constituents of the exhaust gas, such as hydrocarbons and urea, that may be injected upstream of the swirl element into stream 192.

In this manner, the swirl element 124 may be used to improve the efficiency of the PM filter assembly 112. The swirl element 124 also may be used to manage peak temperatures within the filter substrate 170 and thereby improve the reliability of the PM filter assembly 112.

Figure 3:
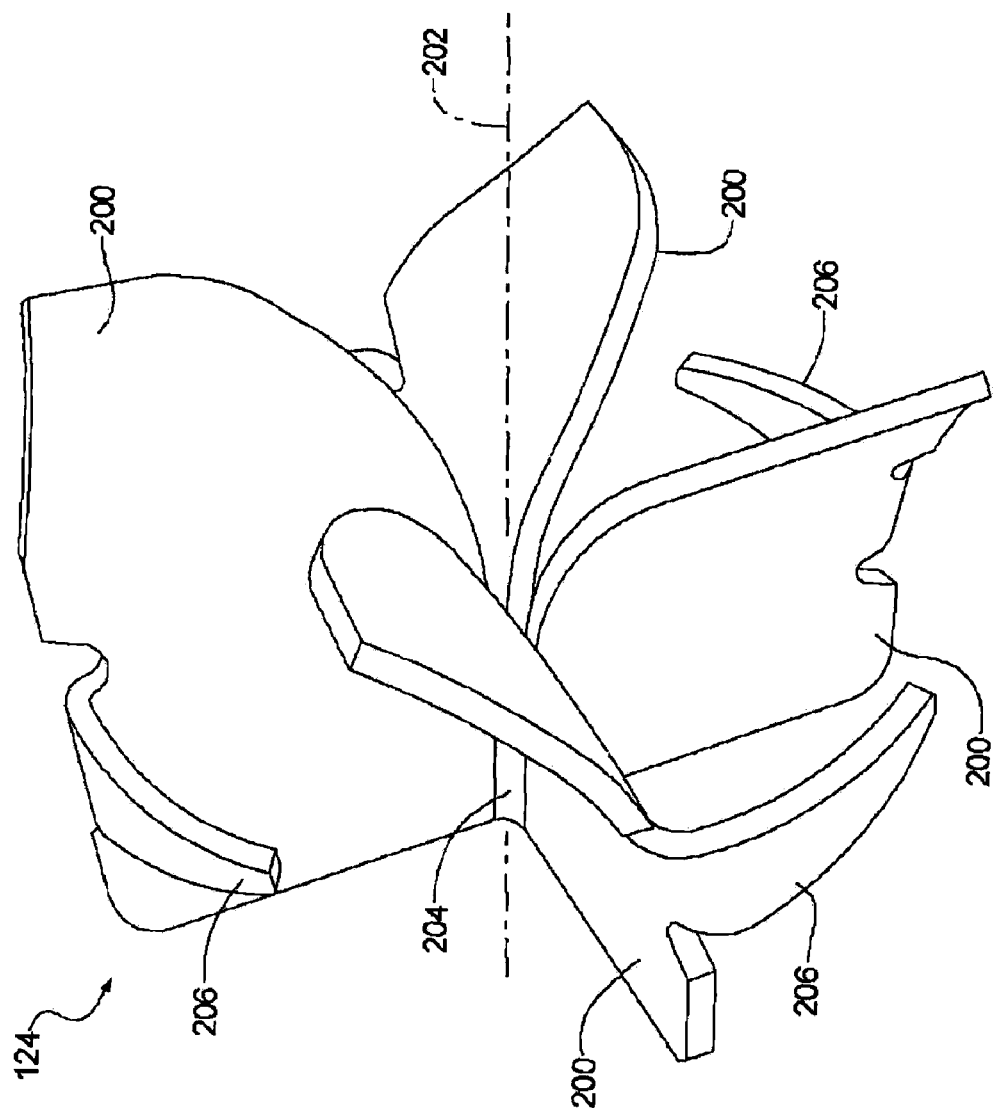
FIG. 3 is an isometric view of an exemplary swirl element according to the principles of the present disclosure.

Referring now to FIGS. 3-5 an exemplary implementation of the swirl element 124 is shown. The swirl element 124 may include one or more blades 200 rotationally positioned about an axis 202. For example, the swirl element 124 may have four blades 200 as shown. The four blades 200 may be located at rotational positions about axis 202 (FIG. 3). Each of the blades 200 may have generally the same size and shape and may be secured together by one or more fillet welds 204.

The swirl element 124 may further include one or more attachment tabs 206 that may be used to position and secure the swirl element 124 within the second end 150 of the inlet pipe 142. When the swirl element 124 is located within the inlet pipe 142, axis 202 may extend in a direction substantially parallel to the inner wall 151 of inlet pipe 142 (FIG. 2). As used herein, substantially parallel means parallel within plus or minus ten degrees.

Alternatively, the swirl element 124 may be positioned within the inlet pipe such that axis 202 extends in a direction that forms a desired angle (not shown) with the inner wall 151. The angle between axis 202 and inner wall 151 may vary and may, for example, be between zero degrees and 75 degrees. Axis 202 may be located a distance away (i.e., offset) from the center of stream 192. Alternatively, axis 202 may be located at the center of stream 192 as shown (FIG. 2).

In the foregoing manner, the swirl element 124 may be positioned within the inlet pipe 142 such that axis 202 extends in a direction substantially parallel to the direction of flow of stream 192 as shown (FIG. 2). Alternatively, the swirl element 124 may be positioned within the inlet pipe 142 such that axis 202 extends in a direction that forms a desired angle with the direction of flow of stream 192. The direction of flow of stream 192 in the inlet pipe 142 may be understood by physical testing of the engine and exhaust system 100, or by computer methods, such as computational fluid dynamics modeling.

The inlet pipe 142 may work together with the expansion pipe 144 to position the swirl element 124 such that axis 202, when projected, intersects the center of frontal area 153. Put another way, the inlet pipe 142 and expansion pipe 144 may work together to align axis 202 and the center of frontal area 153.

With particular reference to FIGS. 4-5, the blades 200 may be thin, broad members that may include lead portions 210 and trailing portions 212 that extend from the lead portions 210. The lead and trailing portions 210, 212 may work together to provide major surfaces 214 of the blades 200 that receive a portion of stream 192 and lift and direct the resulting flow fields 194.

The lead portions 210 may be generally planar in shape and may extend in one direction between axis 202 and an inner wall 151 of the inlet pipe 142 (i.e., radially) and in another direction substantially parallel to axis 202. In this manner, the lead portions 210 may be oriented substantially parallel to the flow of stream 192. The lead portions 210 may include lead edges 216 that define included angles 218 between adjacent blades 200. The lead edges 216 may be generally straight and may extend in a radial direction normal to axis 202. Thus, the lead edges 216 may extend in a direction transverse to the direction of flow of stream 192. The lead portions 210 may adjoin along axis 202 as shown (FIG. 4).

The trailing portions 212 may be generally curved in shape and may extend from the lead portions 210 in a direction away from axis 202. For example, the trailing portions 212 may include curved inner and outer trailing edges 220, 222 that define departure angles 224 (FIG. 5) with respect to axis 202. The departure angles 224 may vary and may be, for example, between zero degrees and 75 degrees. More particularly, the departure angles 224 may be between 40 and 60 degrees. For example, departure angles 224 substantially equal to 45 degrees have been found to be suitable. As used herein, substantially equal angles are angles that are equal within plus or minus ten degrees.

The departure angles 224 defined by the inner trailing edges 220 may be greater than the departure angles 224 defined by the outer trailing edges 222. Put another way, the trailing portions 212 may be twisted about axis 202 such that the inner trailing edges 220 provide more lift to exhaust gas passing over the inner trailing edges 220 than the outer trailing edges 222. The departure angles 224 defined by the inner and outer trailing edges 220, 222 also may vary along their respective lengths.

While the blades 200 may include lead and trailing portions 210, 212 as previously described, the trailing portions 212 may include the lead edges 216. Thus, it is contemplated that the blades 200 may include a single curved member (e.g., trailing portions 212). Additionally, while the trailing portions 212 are described as curved members, the trailing portions 212 may be generally planar in shape and may extend in a direction away from axis 202 as previously described.

The blades 200 may be rotationally positioned in a symmetrical manner about axis 202 such that the included angles 218 between adjacent blades 200 are substantially equal (FIG. 4). For example, where four blades are provided, the included angles 218 may be equal to about 90 degrees.

The blades 200 also may be arranged such that the trailing portions 212 extend in the same rotational direction (e.g., clockwise or counterclockwise) about axis 202 as best seen in FIGS. 3-4. In this manner, the swirl element 124 may be used to create a spiral flow of exhaust gas downstream of the swirl element 124 (i.e., flow fields 194).

The major surfaces 214 define frontal areas 226 (FIG. 4) and chord lengths 228 (FIG. 5). Features of the swirl element 124, such as, but not limited to, the frontal areas 226, chord lengths 228, and departure angles 224 may be chosen to achieve the desired directional flow of the flow fields 194 while minimizing back pressure in stream 192. For example, where four blades 200 are provided and the departure angles 224 are equal to 45 degrees, pressure losses of less than two kilopascals have been achieved. Additionally, the swirl element 124 may be located within the PM filter assembly 112 to achieve the desired distribution of heat and particulate matter within the PM filter assembly 112. For example, the position of the swirl element 124 within the inlet pipe 142 and the distance 190 between the trailing portions 212 and the entry face 134 may be chosen to achieve the desired distribution of heat and particulate matter in the flow fields 194 to the entry face 134.

The attachment tabs 206 may protrude from the blades 200 in a normal direction and may include an outer surface 230 that slidably engages the inner wall 151 of the inlet pipe 142. Each of the blades 200 may include a corresponding one of the attachment tabs 206. The attachment tabs 206 may be secured to the second end 150 of the inlet pipe 142 by any suitable means. For example, the attachment tabs 206 may be welded to the inlet pipe 142. In this manner, the attachment tabs 206 may be used to fixedly position the blades 200 within the inlet pipe 142.

Figure 6:
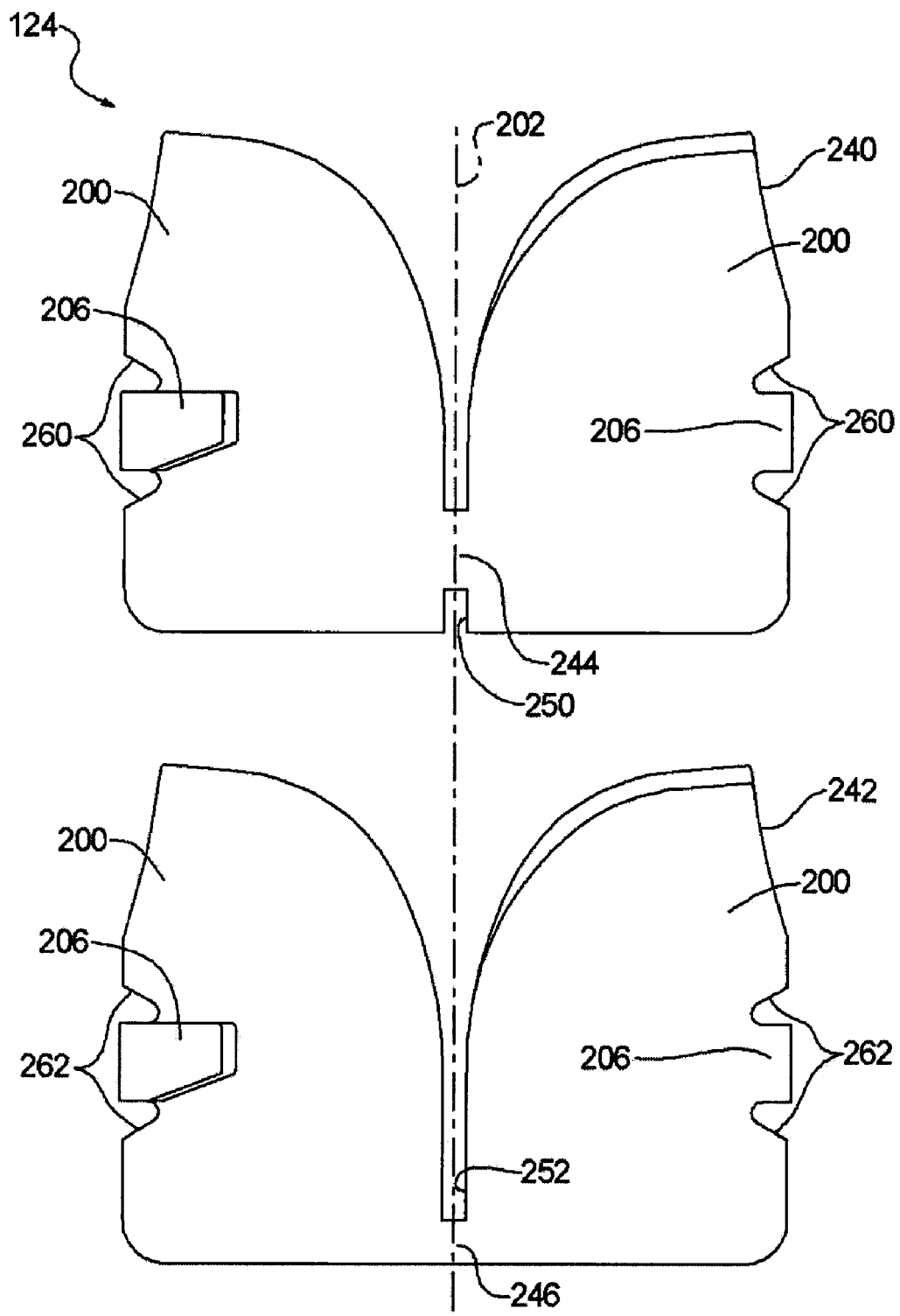
FIG. 6 is an exploded view of the swirl element shown in FIG. 3.

Referring now to FIG. 6 an exemplary construction of the swirl element 124 is shown. The swirl element 124 may include a pair of complementary members 240, 242. The members 240, 242 may be stamped from any suitable sheet metal of suitable thickness. For example, 409 stainless steel sheet metal having a thickness between 1.4 and 1.7 millimeters has been found to be suitable. Additionally, 316 stainless steel sheet metal may be used where the exhaust system 106 includes a DOC assembly or SCR assembly that injects hydrocarbons or urea into the exhaust gas upstream of the swirl element (i.e., into stream 192).

Each of the members 240, 242 may include a pair of blades 200 coupled together by joining portions 244, 246. The joining portions 244, 246 may work together with the blades 200 to define complementary slots 250, 252, respectively. The slots 250, 252 may extend along axis 202 and may be sized to slidably engage one another. In this manner, the slots 250, 252 may be used to slidably position the members 240, 242 with respect to one another. The members 240, 242 may be welded together at the joining portions 244, 246 (e.g., welds 204).

Each of the members 240, 242 may further include a pair of attachment tabs 206 that extend from an outer edge the blades 200 in the same rotational direction when viewed along axis 202 (e.g., clockwise, counterclockwise). Each of the members 240, 242 may include relief notches 260, 262 adjacent the attachment tabs to facilitate the manufacture of the members 240, 242.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A particulate matter (PM) filter assembly comprising:
   a PM filter that filters PM from an exhaust stream and that includes an entry face facing a first direction of flow of said exhaust stream; and
   a swirl element disposed in said exhaust stream and that includes a plurality of blades positioned at rotational angles about a first axis and that direct portions of said exhaust stream in second directions of flow that are different than said first direction of flow to distribute said exhaust stream over said entry face, wherein each of said blades includes an inner trailing edge that defines first departure angles and an outer trailing edge extending radially outward from said inner trailing edge that defines second departure angles, and wherein said first departure angles are greater than said second departure angles.

2. The PM filter assembly of claim 1, wherein said exhaust stream has a first flow area less than a frontal area of said entry face and wherein said blades direct said portions of said exhaust stream to distribute said exhaust stream over said frontal area.

3. The PM filter assembly of claim 1, wherein said first direction of flow and said second directions of flow create a vortex downstream of said swirl element.

4. The PM filter assembly of claim 1, wherein said first axis is parallel to said first direction of flow.

5. The PM filter assembly of claim 1, wherein said blades adjoin along said first axis.

6. The PM filter assembly of claim 1, wherein said rotational angles are equal.

7. The PM filter assembly of claim 1, wherein said blades adjoin along said axis, and wherein said inner trailing edge is a curved edge extending radially outward from said first axis to said outer trailing edge.

8. The PM filter assembly of claim 1, wherein said first departure angles are between thirty five degrees and fifty five degrees.

9. The PM filter assembly of claim 1, wherein said blades include curved trailing portions that extend in the same rotational direction about said first axis and include said inner trailing edge and said outer trailing edge.

10. The PM filter assembly of claim 9, wherein said first and second departure angles are less than 75 degrees.

11. A particulate matter (PM) filter assembly comprising:
    a PM filter that filters PM from an exhaust stream, and that includes an entry face facing a first direction of flow of said exhaust stream;
    an inlet pipe that supplies said exhaust stream to said PM filter, and that includes a first end and a second end downstream of said first end, wherein said second end defines a first flow area of said exhaust stream;
    an expansion pipe that is disposed between said inlet pipe and said PM filter that defines a cavity adjoining said entry face, and that includes a third end connected to said second end and a fourth end adjoining said entry face, wherein said cavity is larger at said fourth end than at said third end; and
    a swirl element that is disposed in said second end and extends into said cavity, and that includes a plurality of blades positioned at rotational angles about a first axis, wherein said first flow area is less than a frontal area of said entry face, and wherein each of said blades directs a portion of said exhaust stream in one of a plurality of second directions of flow different than said first direction of flow to distribute said exhaust stream over said frontal area, and wherein each of said blades includes an inner trailing edge that defines first departure angles and an outer trailing edge extending radially outward from said inner trailing edge that defines second departure angles, and wherein said first departure angles are greater than said second departure angles.

12. The PM filter assembly of claim 11, wherein said blades adjoin along said axis, and wherein said inner trailing edge is a curved edge extending radially outward from said first axis to said outer trailing edge.

13. The PM filter assembly of claim 11, wherein said plurality of blades comprise lead portions that extend in said first direction of flow and that include lead edges disposed in said second end that extend in transverse directions to said first direction of flow; and trailing portions that extend from said lead portions in said second directions of flow, and wherein said trailing portions include said inner trailing edge and said outer trailing edge.

14. The PM filter assembly of claim 13, wherein said lead portions adjoin along said first axis.

15. The PM filter assembly of claim 13, wherein said first axis is parallel to said first direction of flow.

16. The PM filter assembly of claim 13, wherein said rotational angles are equal.

17. A method of filtering particulate matter (PM) comprising:
    providing an exhaust stream that has a first flow area in a first direction of flow;
    providing a PM filter that filters PM from said exhaust stream, and that includes an entry face that faces said first direction of flow and has a frontal area greater than said first flow area; and distributing said exhaust stream over said frontal area by directing portions of said exhaust stream in second directions of flow different than said first direction of flow, wherein said step of distributing said exhaust stream further includes (i) disposing a plurality of blades about an axis in said exhaust stream that direct said portions of said exhaust stream in said second directions of flow, (ii) directing first portions of said exhaust stream at first departure angles using inner trailing edges of said blades, and (iii) directing second portions of said exhaust stream at second departure angles less than said first departure angles using outer trailing edges of said blades that extend radially outward from said inner trailing edges.

18. The method of claim 17, wherein said distributing said exhaust stream further includes creating a vortex in said exhaust stream downstream of said blades.

19. The method of claim 17 further comprising aligning a center of said frontal area and said axis.

* * * * *